(12) United States Patent
Granito

(10) Patent No.: US 9,154,563 B2
(45) Date of Patent: Oct. 6, 2015

(54) ALERTS FOR MONITORING USER STATUS

(75) Inventor: Jennifer Granito, San Francisco, CA (US)

(73) Assignee: AOL Inc., Dulles, VA (US)

(*) Notice: Subject to any disclaimer, the term of this patent is extended or adjusted under 35 U.S.C. 154(b) by 0 days.

(21) Appl. No.: 11/553,768

(22) Filed: Oct. 27, 2006

(65) Prior Publication Data

US 2007/0250622 A1    Oct. 25, 2007

Related U.S. Application Data

(60) Provisional application No. 60/794,126, filed on Apr. 24, 2006.

(51) Int. Cl.
*G06F 15/173* (2006.01)
*H04L 29/08* (2006.01)
*H04L 12/58* (2006.01)

(52) U.S. Cl.
CPC .............. *H04L 67/22* (2013.01); *H04L 12/581* (2013.01); *H04L 51/04* (2013.01); *H04L 12/5885* (2013.01)

(58) Field of Classification Search
CPC ...................................................... H04L 67/22
USPC ................... 709/206, 207, 224, 225; 715/736
See application file for complete search history.

(56) References Cited

U.S. PATENT DOCUMENTS

| | | | |
|---|---|---|---|
| 5,553,235 A * | 9/1996 | Chen et al. ....................... 714/20 |
| 6,449,344 B1 | 9/2002 | Goldfinger et al. |
| 6,640,238 B1 * | 10/2003 | Bowman-Amuah .......... 709/201 |
| 6,772,195 B1 * | 8/2004 | Hatlelid et al. ................ 709/204 |
| 7,149,775 B2 | 12/2006 | Goldfinger et al. |
| 7,248,677 B2 * | 7/2007 | Randall et al. .............. 379/93.23 |
| 7,272,662 B2 * | 9/2007 | Chesnais et al. .............. 709/246 |
| 7,653,724 B2 * | 1/2010 | Blumenau ...................... 709/224 |
| 2002/0129027 A1 * | 9/2002 | Cameron et al. ................. 707/10 |
| 2003/0009530 A1 * | 1/2003 | Philonenko et al. .......... 709/206 |
| 2004/0119814 A1 * | 6/2004 | Clisham et al. ............. 348/14.08 |
| 2004/0162881 A1 * | 8/2004 | Digate et al. .................. 709/206 |
| 2004/0162882 A1 * | 8/2004 | Mora ............................. 709/207 |
| 2004/0205175 A1 * | 10/2004 | Kammerer ..................... 709/223 |
| 2004/0230659 A1 * | 11/2004 | Chase ........................... 709/206 |
| 2005/0041793 A1 * | 2/2005 | Fulton et al. .............. 379/211.01 |
| 2005/0058094 A1 * | 3/2005 | Lazaridis et al. ............. 370/328 |
| 2005/0235035 A1 * | 10/2005 | Benejam et al. .............. 709/206 |
| 2005/0271004 A1 * | 12/2005 | Cho .............................. 370/328 |
| 2006/0069580 A1 * | 3/2006 | Mason et al. ...................... 705/1 |
| 2006/0190591 A1 * | 8/2006 | Bobde et al. .................. 709/224 |
| 2007/0061453 A1 | 3/2007 | Goldfinger et al. |
| 2007/0250622 A1 | 10/2007 | Granito |
| 2008/0005325 A1 * | 1/2008 | Wynn et al. .................... 709/225 |

OTHER PUBLICATIONS

International Search Report and Written Opinion issued in International Application No. PCT/US07/67298 mailed Apr. 23, 2008, 9 pages.

* cited by examiner

*Primary Examiner* — Gerald Smarth
(74) *Attorney, Agent, or Firm* — Finnegan, Henderson, Farabow, Garrett & Dunner, LLP

(57) ABSTRACT

A method of monitoring a user of a communication system includes enabling a first user to initiate monitoring of a second user, automatically monitoring status of activity by the second user on the communication system, and delivering to the first user, one or more of an indication that the second user has added or changed a profile or away message, received a new or updated profile or away message comment, visited an Internet location, engaged in communication device activity, or has generated audio or visual input.

20 Claims, 7 Drawing Sheets

500

IM Monitoring Indication From Neveraround13 — 510

Neveraround13 is now active on mobile messaging on cell-phone 123-456-7890 — 520

To send Neveraround13 an IM, press 1 and type — 530

To send Neveraround13 an email, press 2 and type — 540

To leave Neveraround13 a profile comment, press 3 and type — 550

To view monitoring indication setting for Neveraround 13, press 4 — 560

610 — Email Monitoring Indication From Neveraround13

620 — Neveraround13 has updated their away message. The new message is:

630 — "Busy drafting patent applications, I should be back in about an hour"

640 — To view send Neveraround13 an email, just reply to this message

Fig. 6

ALERTS FOR MONITORING USER STATUS

TECHNICAL FIELD

This application relates to monitoring a user of a computer system.

BACKGROUND

Individuals may wish to monitor characteristics of other individuals using electronic devices.

SUMMARY

A method of monitoring a user of a communication system includes enabling a first user to initiate monitoring of a second user, automatically monitoring status of activity by the second user on the communication system, and delivering to the first user, one or more of an indication that the second user has added or changed a profile or away message, received a new or updated profile or away message comment, visited an Internet location, engaged in communication device activity, or has generated audio or visual input.

The method may include other features. For example, the status of activity by the second user may be monitored on multiple communications devices, such as a wireless phone or personal digital assistant.

Delivering an indication to the first user may include delivering an instant message, delivering an email, or delivering a short message service message. Delivering an indication to the first user may also include delivering user history statistics associated with the second user.

The method may include enabling the first user to specify a form in which the indication is delivered. The form may be based on the monitored activity by the second user. The first user may specify that multiple forms of indications be sent based on one monitored activity.

Delivering an indication to the first user may also include delivering an indication that the second user has engaged in a telephone call, delivering an indication which includes at least a summary or partial content of a second user's away message or profile, delivering an indication which includes a comment made about the second user's away message or profile, delivering an internet protocol address or a media access control address, delivering an indication that the second user has generated input using a microphone, or delivering an indication that the second user has generated input using a camera.

The method may also include enabling the first user to respond to the monitoring indication by sending a reply to the second user. The first user may specify the form of the reply sent to the second user.

The details of one or more implementations are set forth below. Other features and advantages will be apparent from the description and drawings, and from the claims.

DESCRIPTION OF DRAWINGS

FIG. 5 is an exemplary graphic user interface of an instant message based monitoring indication.

FIG. 6 is an exemplary graphic user interface of an email based monitoring indication.

Like reference symbols in the various drawings indicate like elements.

DETAILED DESCRIPTION

Figure 1:
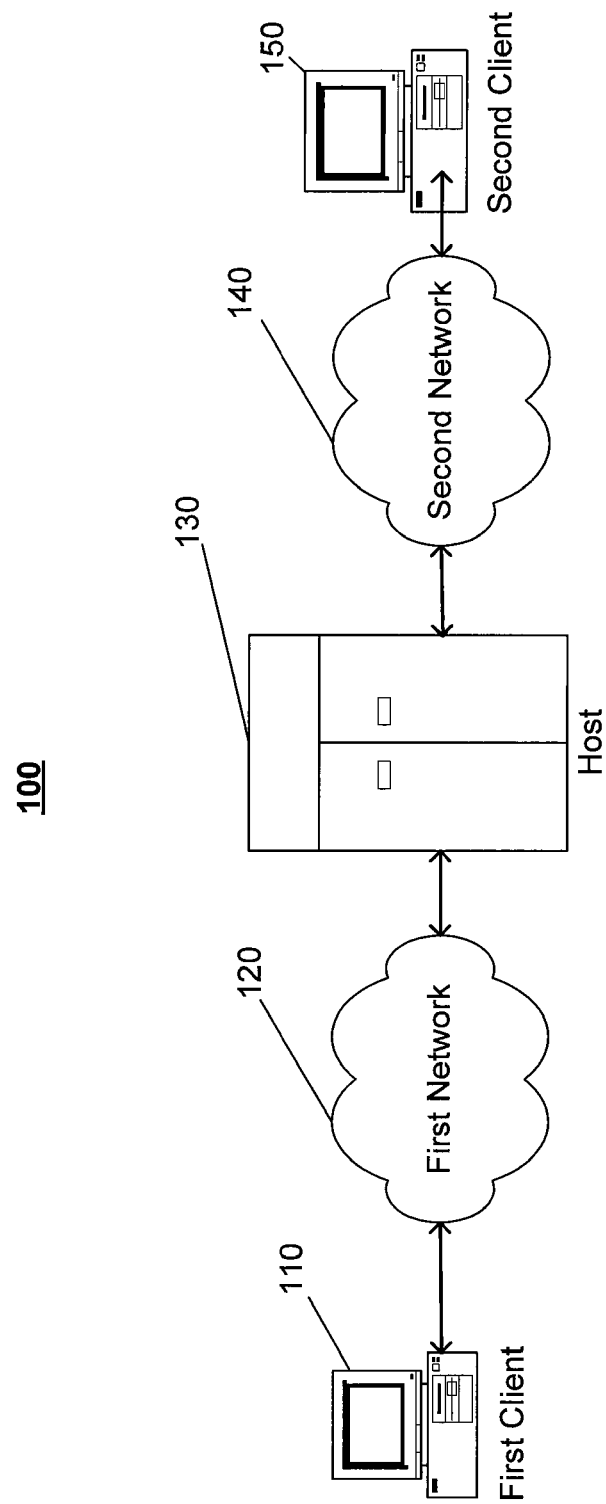
FIG. 1 illustrates an exemplary block diagram of a system to provide indications of a user status.

Referring to FIG. 1, a system 100 is configured to permit the status of a user of a first client 110 to be monitored by a user of a second client 150. The system 100 includes the first client 110, a first network 120, a host 130, a second network 140, and the second client 150.

Each of the first client 110, the host 130, and the second client 150 may be implemented by, for example, a general-purpose computer capable of responding to and executing instructions in a defined manner, a personal computer, a special-purpose computer, a workstation, a server, a device, a component, other equipment or some combination thereof capable of responding to and executing instructions. The first client 110, the host 130, and the second client 150 may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the first client 110, the host 130, and the second client 150.

The first client 110 and the second client 150 may include one or more devices capable of accessing content on the host 130. The host 130 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, each of the first client 110 and the second client 150 includes one or more information retrieval software applications (e.g., a browser, a mail application, an instant messaging client, an Internet service provider client, or a media player) capable of receiving one or more data units. The information retrieval applications may run on a general-purpose operating system and a hardware platform that includes a general-purpose processor and specialized hardware for graphics, communications and/or other capabilities. In another implementation, the first client 110 and the second client 150 may include a wireless telephone running a microbrowser application on a reduced operating system with general purpose and specialized hardware capable of operating in mobile environments.

More particularly, the first client 110 may be configured to receive indications of a user status for a user of the first client 110. The indications may detail status changes, profile changes, or user activities. The indications may be delivered in the form of an instant message (IM), email, short message service (SMS) message, or other text-based, graphical, or audio message. The second client 150 may be configured to provide information associated with the status indications to another client (e.g. the first client 110) or the host 130.

The first network 120 and second network 140 include hardware and/or software capable of enabling direct or indirect communications between the first client 110 or the second client 150 and the host 130. As such, the networks 120 and 140 may include a direct link between the first client 110 or the second client 150 and the host 130, or they may include one or more networks or sub networks between them (not shown). Each network or sub network may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data. Optionally, the network 120 linked to the first client 110 may be the same network as the network 140 linked to the second client 150.

The host 130 may include a general-purpose computer having a central processor unit (CPU), and memory/storage devices that store data and various programs such as an operating system and one or more application programs. Other examples of a host 130 includes a workstation, a server, a special purpose device or component, a broadcast system, other equipment, or some combination thereof capable of responding to and executing instructions in a defined manner. The host 130 also may include an input/output (I/O) device (e.g., video and audio input and conversion capability), and peripheral equipment such as a communications card or device (e.g., a modem or a network adapter) for exchanging data with the networks 120 and 140.

The host 130 is generally capable of executing instructions under the command of a controller. The host 130 may be used to exchange content with the first client 110 and the second client 150. The controller may be implemented by a software application loaded on the host 130 for commanding and directing communications exchanged with the first client 110 and the second client 150. Other examples of the controller include a program, a piece of code, an instruction, a device, a computer, a computer system, or a combination thereof, for independently or collectively instructing the client 110 or the host 130 to interact and operate as described. The host 130 may be embodied permanently or temporarily in any type of machine, component, physical or virtual equipment, storage medium, or propagated signal capable of providing instructions.

The host 130 may be configured to receive information associated with the status of users of the clients 110 and 150, and other clients. The host 130 may determine whether the information is to be delivered as an indication to a user. The indication may be delivered in the form of an IM, email, SMS message, or other text-based, graphical, or audio message that may be received by the user.

Figure 2:
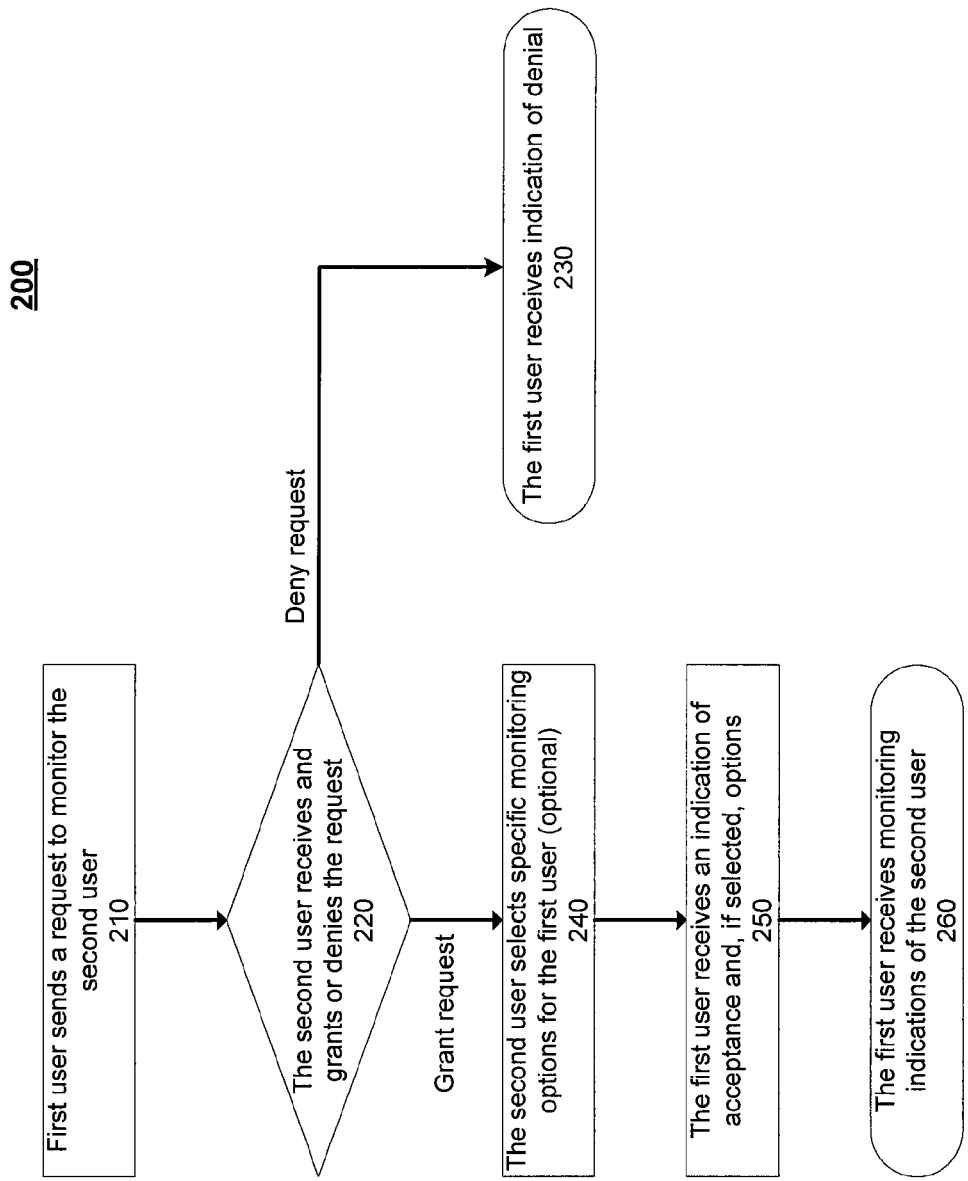
FIG. 2 illustrates an exemplary flow chart of a process to grant or deny access to indications of user status.

Referring to FIG. 2, a process 200 may be used to grant or deny request decision for a request to monitor a user status. The process 200 is optional, as some implementations may not include a grant or deny request. The process 200 may be implemented on the system 100 of FIG. 1, or another system.

The process 200 begins when a first user sends a request to monitor the second user (210). In one implementation, the request is sent to a host. In another implementation, the request is sent to the second user. The request may contain monitoring options. The monitoring options may detail types of events for which the first user wishes to receive indications, such as profile updates or activity level. The monitoring options may also include the preferred method of indication delivery, such as IM or SMS message.

The second user receives the request to monitor the second user and grants or denies the request (220). The second user may select whether to specifically grant or deny the first user's request, or the decision may be automatically determined. For example, in one implementation, all requests from users on a list (e.g., a "buddy list") are automatically granted, and all requests from users not on the list are denied.

If the second user denies the request, the first user receives an indication of the request denial (230). If the second user grants the request, the second user may optionally select specific monitoring options for the first user (240). The monitoring options may include the same options as included in the first user's request (210), or may include different options. For example, a second user may select to allow the first user to receive indications directed to the second user's profile updates, but not allow indications directed to status changes.

The first user receives an indication of the request acceptance which may include selected options (250). The first user receives monitoring indications of the second user (260). The indications may be delivered in the form of an IM, email, short message service (SMS) message, or other text based message that may be received by the first user.

The previous description is an example implementation of the grant or deny request decision for a request to monitor a user status process. Other implementations may be organized differently and may include different steps. For example, the first user's request to monitor the second user may be initiated automatically by including the second user on a list (e.g. a "buddy list"). Further, the request to monitor the second user may be directed to a user other than the second user.

Figure 3:
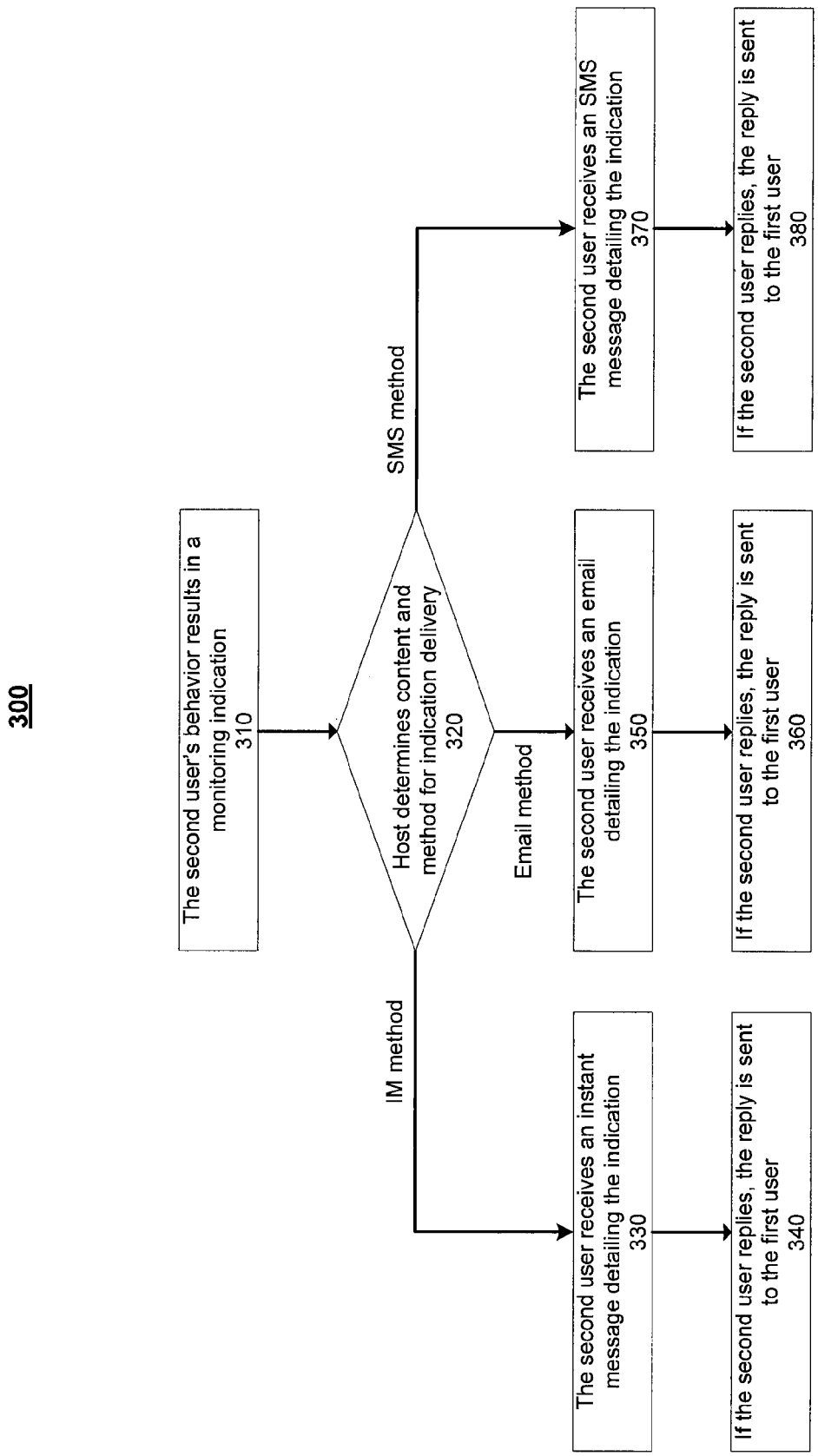
FIG. 3 illustrates an exemplary flow chart of a process to provide indications of a user status.

Referring to FIG. 3, a process 300 is shown to provide indications of a user status. The process 300 may occur after the grant or deny request decision for a request to monitor a user status process 200 is executed, or may occur independently. The process 300 may be implemented on the system 100 of FIG. 1, or another system.

The process 300 begins when the second user's behavior results in a monitoring indication (310). The behavior resulting in a monitoring indication may include being online, offline, away, present, idle, active, or adding or changing an away message or profile that may be stored on the host, client, or elsewhere. The behavior may also including executing applications on various platforms, surfing the web, and average activity times for instant messaging, email, chat, or running the client. For example, in one implementation, indications are delivered at specific intervals independent of the second user's status.

The host determines content and method for indication delivery (320). The content may include text describing the behavior, a summary of text associated with the behavior, or a quote of the text associated with the behavior.

For example, in one implementation, if the indication is directed towards an away status change, the indication states "second user is now away." If the indication is directed towards an away message, the indication states "second user's away message is [followed by the complete contents of the away message]." If the indication is directed towards an updated profile, the indication states "second user's updated profile is [followed by a summary or excerpt of the update]."

The method for indication delivery may include an IM, email, SMS message, or other text-based, graphical, or audio message that may be received by the first user. The host may have a predetermined method for indication delivery for the first user, or may employ a set of rules to determine the method for indication delivery.

For example, in one implementation, the host has a stored order of preferred methods stating that if the first user is online, the host delivers the indication via IM. If the user is not online, the host delivers the indication via email. If the email fails or is "bounced," the host delivers the indication via SMS.

If all methods of indication delivery fail, a message detailing the failures may be presented to the second user.

If the IM method is determined, the first user receives an IM detailing the indication (330). Optionally, if the first user replies to the IM, the reply is sent to the second user as (340), for example, an IM.

If the email method is determined, the first user receives an email detailing the indication (350). Optionally, if the first user replies to the email, the reply is sent to the second user as (360), for example, an IM.

If the SMS method is determined, the first user receives an SMS detailing the indication (370). Optionally, if the first user replies to the SMS, the reply is sent to the second user as (380), for example, an IM.

The previous description is an example implementation of the provide indications of a user status process. Other implementations may be organized differently and may include different steps. For example, when determining message content, the host may take the method for indication delivery into account. If the method is email, a longer content may be chosen than if the method is IM or SMS. Also, multiple or all methods of indication delivery may be selected for a single monitoring indication.

Also, in various implementations, a monitoring indication may include user activity history. For example, user activity history may include user history statistics such as average IMs sent during hours of the day, most common usage time, or other activity statistics.

Further, in various implementations, computer input hardware may trigger a monitoring indication. For example, a microphone or webcam may trigger an indication when a sudden change of input is observed. The indications may include input from the computer input hardware. For example, if a webcam senses a user, an indication may be generated which includes a picture taken by the webcam.

Figure 4:
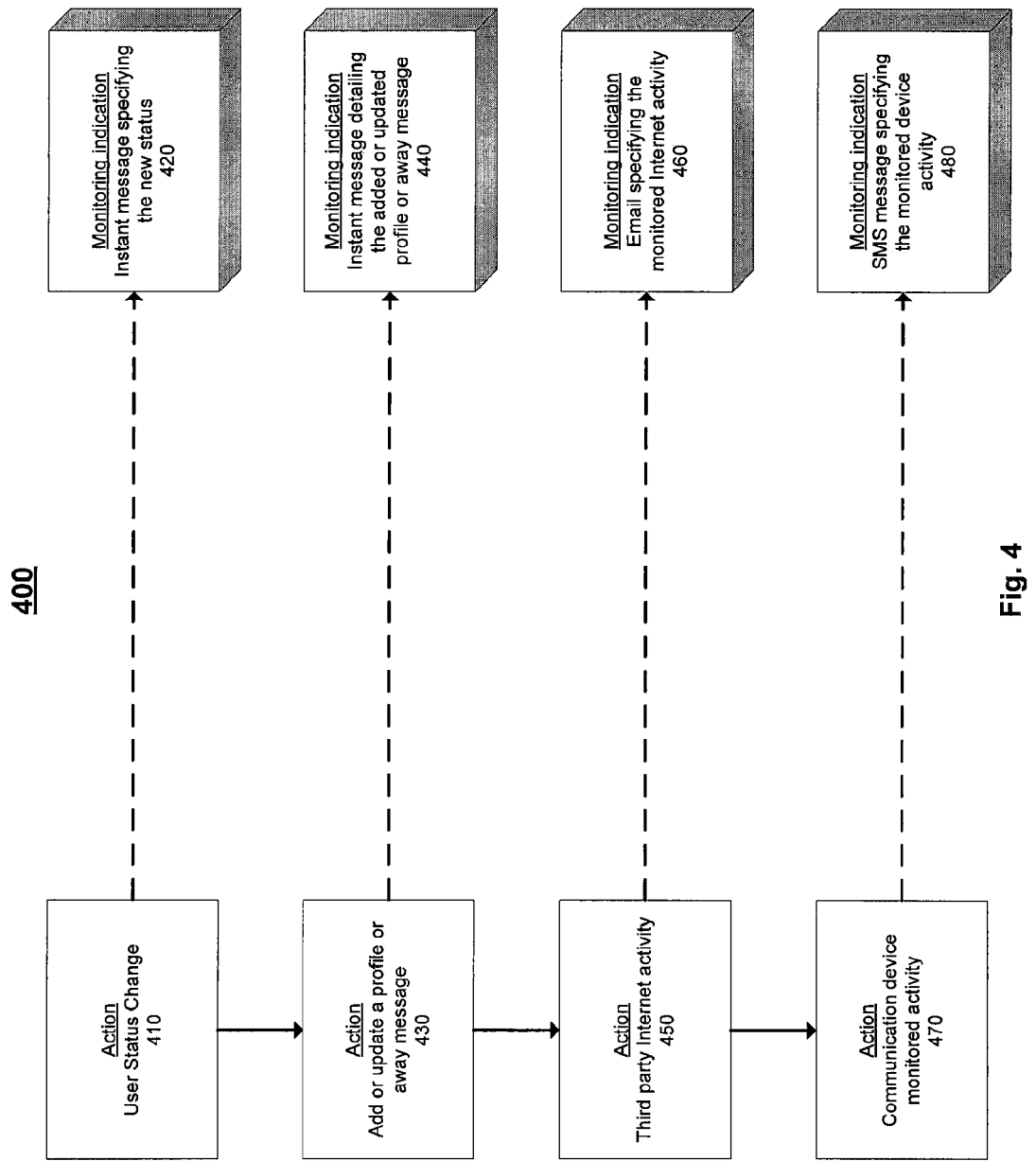
FIG. 4 illustrates an exemplary flow chart of a process to trigger monitoring indications from user actions.

Referring to FIG. 4, a process 400 is used to trigger monitoring indications from user actions. The process 400 may occur after the decision to grant or deny a request to monitor a user status process 200 is executed, or may occur independently. The process 400 may be implemented on the system 100 of FIG. 1 or another system. The process 400 includes various triggers that may result in a monitoring indication. The triggers include a user status change 410, adding or updating a profile or away message 430, third-party Internet activity 450, or device-monitored activity 470.

A user status change 410 may result when the user changes status within an instant messaging program. The changed status 410 may include states such as online, offline, away, present, idle, active, or other states. In one implementation, the user may manually set a status change 410. In other implementations, the status change 410 is triggered automatically by a user's actions or behaviors. The status change 410 triggers a monitoring indication to a recipient in the form of an instant message 420 that specifies the new status of the user. The monitoring indication 420 may be sent as the status change occurs, periodically, or when requested by a recipient.

Another trigger results when the user adds or updates a profile or away message 430 within the instant messaging program. The added or updated profile or away message 430 may include the introduction, change, deletion, or receipt of comments for a profile or away message within the program. The added or updated profile or away message 430 triggers a monitoring indication to the recipient in the form of an instant message 440 detailing the added or updated profile or away message. In one implementation, when the user receives a comment directed to the user's away message, the recipient may receive a monitoring indication detailing the comment. For example, the user may receive the comment "great away message" in response to an active away message created by the user. The comment triggers a monitoring indication which is sent as an instant message to a recipient who is monitoring the user.

Another trigger results when the user engages in third-party Internet activity 450. The third-party Internet activity may include visiting a webpage, running file-sharing or instant messaging programs, running games, or other activities. The third-party Internet activity triggers a monitoring indication in the form of an email specifying the monitored Internet activity 460. The email may include details of the user activity. For example, a user may run a second instant messaging program triggering a monitoring indication in the form of an email specifying the activity and when it occurred. In one implementation, the monitoring indication may be in the form of an instant message.

A trigger also may occur in response to user activity 470 monitored by a user device. The user device may be a wireless phone, a microphone, a webcam, a mouse, or another device associated with the user. The activity triggers a monitoring indication in the form of a SMS message 480 specifying the monitored activity. For example, a user may place a phone call on a wireless phone which triggers a monitoring indication in the form of a SMS message detailing that a phone call has been made. Other implementations may result in different monitoring indications. For example, in one implementation, when a user's webcam monitors an abrupt visual change, a picture is taken and emailed or instant messaged to a recipient.

The previous description is an example implementation of the process for triggering monitoring indications from user actions. Other implementations may be organized differently and may include different steps. For example, in one implementation, a recipient may request a mass monitoring indication which triggers an on-demand monitoring indication for a group of users to be detailed in an instant message to the recipient.

FIG. 5 is an exemplary graphic user interface (GUI) 500 of an instant message-based monitoring indication. The GUI 500 may be used to implement a process such as the process of FIG. 3.

The GUI includes an indication title 510, an indication description 520, an IM reply option 530, an email reply option 540, a profile comment option 550, a view monitoring indication settings option 560, and a text entry box 570. The indication title 510 introduces the indication and may include the username to which the indication is directed. The indication description 520 summarizes the monitoring indication and the trigger associated with the monitoring indication. The IM reply option 530 gives the option of replying to the indication by sending an IM to the monitored user. The email reply option 540 gives the option of replying to the indication by sending an email to the monitored user. The profile comment option 550 gives the option of replying to the indication by sending a comment to the profile of the monitored user. The view monitoring indication settings option 530 enables access to view, change, or request a change of the monitoring indication settings. The text entry box 570 enables input to be entered for delivery as an IM, email, or SMS message.

The IM monitoring indication may be sent and received in a variety of ways. For example, the GUI may be sent as an IM directed from the host, as an IM from an IM-bot, as an IM from the monitored user, or by another method.

FIG. 6 is an exemplary GUI 600 of an email based monitoring indication. The GUI 600 may be used to implement a process such as the process of FIG. 3.

The GUI includes an indication title 610, an indication description 620, an indication body 630, and an email reply option 640. The indication title 610 introduces the indication and may include the username to which the indication is directed. The indication description 620 summarizes the monitoring indication and the trigger associated with the monitoring indication. The indication body 630 presents a copy of the new away message that triggered the indication. The email reply option 640 gives the option of replying to the indication by sending an email to the monitored user.

The email monitoring indication may be sent and received in a variety of ways. For example, the email may be sent as an email directed from the host, as an email from the monitored user, or by another method.

Figure 7:
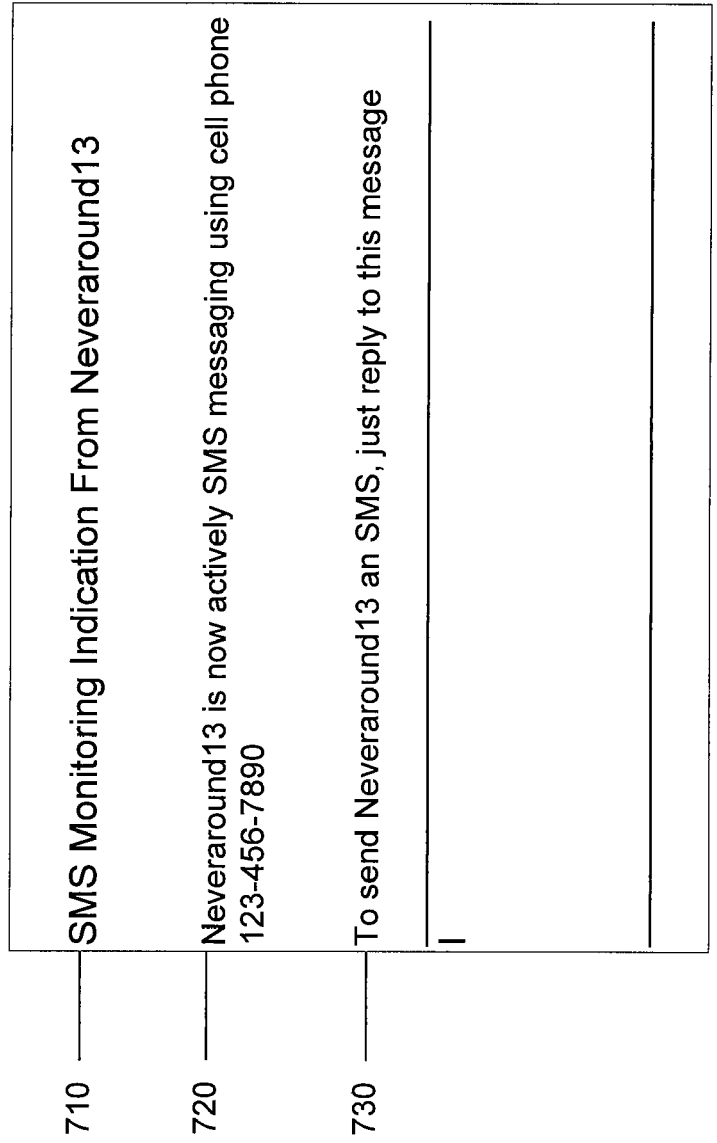
FIG. 7 is an exemplary graphic user interface of a short message service message based monitoring indication.

FIG. 7 is an exemplary GUI 700 of a SMS-based-monitoring indication. The GUI 700 may be used to implement a process such as the process of FIG. 3.

The GUI includes an indication title 710, an indication description 720, and reply instructions 730. The indication title 710 introduces the indication and may include the username to which the indication is directed. The indication description 720 summarizes the monitoring indication and the trigger associated with the monitoring indication. The reply instructions 730 include instructions detailing reply options to the SMS message.

The SMS message monitoring indication may be sent and received in a variety of ways. For example, the SMS message monitoring may be sent as an email directed from the host, as an email from the monitored user, or by another method.

Other implementations are within the scope of the following claims.

What is claimed is:

1. A method of monitoring a user of a communication system that maintains status information and electronically communicates user-submitted content, the method comprising:
    enabling, using at least one processor, a first user of the communication system to submit a request including parameters to monitor status information and user-submitted content of a second user of the communication system;
    communicating the parameters of the request to the second user;
    responsive to communicating the request, receiving an authorization decision from the second user, including one of:
        granting authorization of the request to monitor the status information and user-submitted content of the second user, and
        denying authorization of the request to monitor the status information and user-submitted content of the second user;
    enabling, using the at least one processor, monitoring by the first user, based on the second user's granting of authorization of the request to monitor the status information and user-submitted content of the second user, including enabling the first user to view user-submitted content that is included in a communication that is not addressed to the first user or originated by the first user; and
    enabling receipt, by the first user, of an indication of the monitored status information and user-submitted content of the second user.

2. The method of claim 1, further comprising enabling the monitoring of the status information and user-submitted content of the second user on multiple communications devices.

3. The method of claim 1, wherein enabling monitoring of the status information and user-submitted content of the second user comprises monitoring the status information and user-submitted content of the second user on a wireless phone or personal digital assistant.

4. The method of claim 1, wherein enabling receipt of the indication includes delivering an instant message.

5. The method of claim 1, wherein enabling receipt of the indication includes delivering an email.

6. The method of claim 1, wherein enabling receipt of the indication includes delivering a short message service message.

7. The method of claim 1, wherein enabling receipt of the indication includes delivering at least a portion of user-submitted content identified based upon the monitored user-submitted content of the second user.

8. The method of claim 1, further comprising enabling the first user to specify a form in which the indication is delivered.

9. The method of claim 8 wherein specifying the form in which the indication is delivered includes specifying a form based on the monitored user-submitted content of the second user.

10. The method of claim 8, wherein specifying the form in which the indication is delivered includes specifying that multiple forms of indications are to be sent based on one piece of monitored user-submitted content.

11. The method of claim 1, wherein enabling receipt of the indication includes delivering an indication that new user-submitted content regarding the second user has been generated by a third user.

12. The method of claim 1, wherein enabling receipt of the indication includes delivering an indication which includes at least a summary or partial content of a second user's profile.

13. The method of claim 1, wherein enabling receipt of the indication includes delivering an indication which includes a comment associated with the second user's away message or profile.

14. The method of claim 1, wherein enabling receipt of the indication includes delivering an internet protocol address or a media access control address.

15. The method of claim 1, wherein enabling receipt of the indication includes enabling receipt of an indication which specifies that the second user has generated input using a microphone.

16. The method of claim 1, wherein enabling receipt of the indication includes enabling receipt of an indication which specifies that the second user has generated input using a camera.

17. The method of claim 1, further comprising enabling the first user to respond to the indication of the monitored status information and user-submitted content of the second user by sending a reply to the second user.

18. The method of claim 17, wherein enabling the first user to respond to the indication of the monitored status information and user-submitted content of the second user includes enabling the first user to specify the form of the reply sent to the second user.

19. A method of monitoring a user of a communication system that maintains status information and electronically communicates user-submitted content, the method comprising:
    enabling, using at least one processor, a first user of the communication system to submit a request including parameters to monitor status information and user-submitted content of a second user of the communication system;

communicating the parameters of the request to the second user;

responsive to communicating the request, receiving an authorization decision from the second user, including at least one of:
   granting or denying authorization of the request to monitor the user-submitted content of the second user, and
   granting or denying authorization of the request to monitor he status information of the second user;

enabling, using the at least one processor, monitoring by the first user, based on the second user's granting authorization of the request to monitor the status information and user-submitted content of the second user, including enabling the first user to view user-submitted content that is included in a communication that is not addressed to the first user or originated by the first user; and enabling receipt, by the first user, based on the second user's granting authorization of the request to monitor the status information and user-submitted content of the second user, of an indication of the monitored status information and user-submitted content of the second user.

20. A method of monitoring a user of a communication system that maintains profile information and electronically communicates user-submitted content, the method comprising:

enabling, using at least one processor, a first user of the communication system to submit a request including parameters to monitor profile information of a second user of the communication system, wherein the first and second user are able to view each other's profile information within the communication system;

communicating the request from the first user to the second user;

responsive to communicating the request, receiving an authorization decision from the second user including granting authorization of at least one parameter of the request to monitor profile information of the second user;

monitoring, using the at least one processor, activity of the second user;

determining, using the at least one processor, based on the monitored activity of the second user, that the second user has updated a profile associated with the communication system or received a comment related to the profile associated with the communication system, wherein updating the profile comprises adding user-submitted content to the profile; and enabling receipt, by the first user, of an indication that the second user has updated the profile associated with the communication system or received a comment related to the profile associated with the communication system based on the second user's granting of authorization of the request to monitor profile information.

* * * * *